(No Model.)
R. FURLONG.
LADDER.
No. 322,171. Patented July 14, 1885.
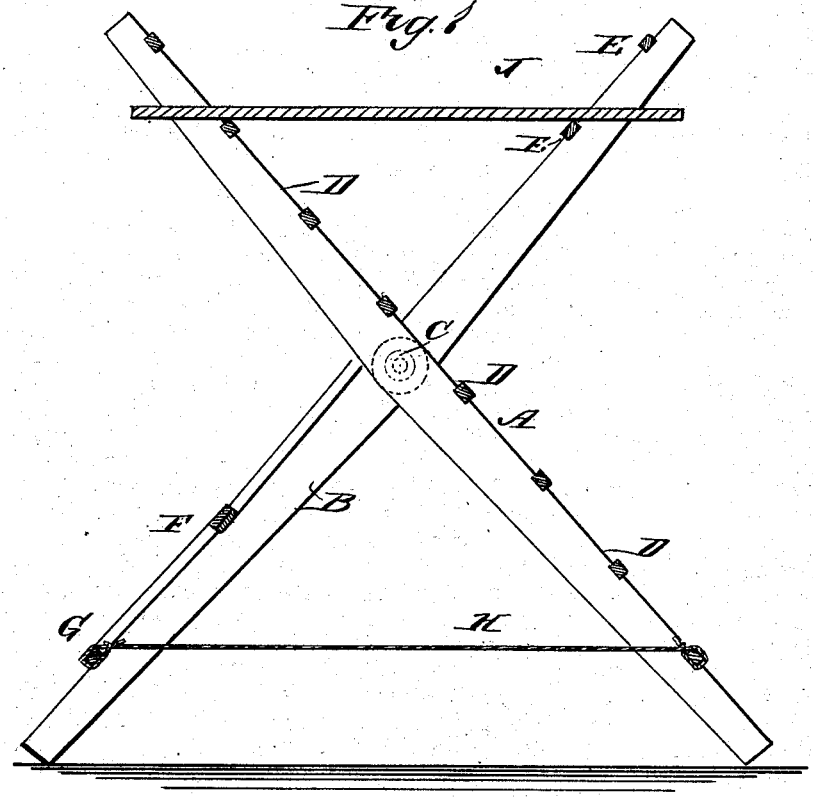
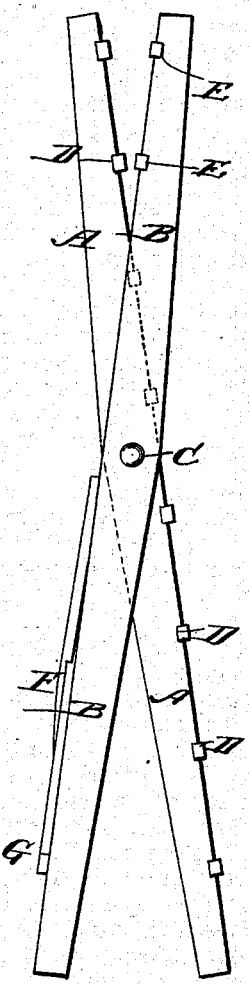
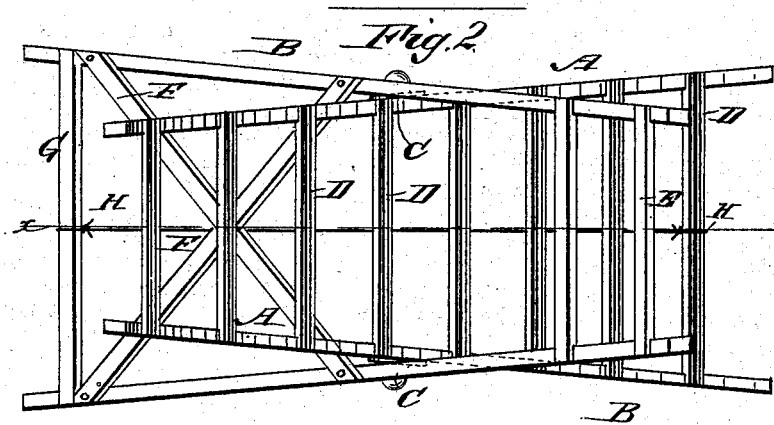
WITNESSES:
F. McArdle.
C. Sedgwick
INVENTOR:
R. Furlong
BY Munn & Co
ATTORNEYS.

UNITED STATES PATENT OFFICE.

ROBERT FURLONG, OF SAUCELITO, CALIFORNIA.

LADDER.

SPECIFICATION forming part of Letters Patent No. 322,171, dated July 14, 1885.

Application filed April 16, 1885. (No model.)

*To all whom it may concern:*

Be it known that I, ROBERT FURLONG, of Saucelito, Marin county, California, have invented a new and Improved Ladder, of which the following is a full, clear, and exact description.

The object of my invention is to provide a new and improved adjustable ladder for house or orchard use, and which is adapted to support a platform when desired.

The invention consists in the combination, with two pairs of bars pivoted at or near their middles, of rungs uniting one pair of bars and cross-bars, and braces uniting the other pair.

The invention also consists in parts and details and combinations of the same, as will be fully set forth hereinafter.

Reference is to be had to the accompanying drawings, forming part of this specification, in which similar letters of reference indicate corresponding parts in all the figures.

Figure 1 is a longitudinal sectional elevation of my improved ladder on the line $x\,x$, Fig. 2, erected. Fig. 2 is a plan view of the same. Fig. 3 is a side view of the same folded.

Two pairs of side bars, A and B, are pivoted to each other in pairs, short distances above their middles, by pivots C. The bars A are united by a series of rungs, D, and the bars B are united by a series of cross-bars, E, at the top, and crossed braces F, and a cross-bar, G, at or near the lower ends. The bars A, as well as the bars B, are inclined toward each other from their lower to their upper ends. The bars are widest at the pivots, and decrease from the pivots to the upper and lower ends. A strap, provided with a buckle or a rope, H, is secured to the bottom rung, D, and the cross-bar G, and prevents the ladder from spreading too far, and serves to hold the two pivoted sections at the desired inclination. A platform, J, is placed on the upper rungs, D, and the bars E, and can be used by painters, plasterers, carpenters, &c., or by persons picking fruit, trimming trees, &c. The ladder can also be used without the platform. The platform can be adjusted higher by placing it on higher rungs, or by moving the lower ends of the pivoted sections toward each other.

Having thus described my invention, I claim as new and desire to secure by Letters Patent—

1. The combination, with the bars A and B, pivoted at or near their middles, of the rungs D uniting the bars A, and bars and braces uniting the bars B, substantially as herein shown and described.

2. The combination, with the bars A B, pivoted together at or near their middles, of the rungs D uniting the bars A, the braces F and the cross-bars E uniting the bars B, and the platform J, substantially as herein shown and described.

3. The combination, with the pivoted bars A and B, pivoted at or near their middles, of the rungs D uniting the bars A, cross-bars and braces uniting the bars B, the bars A and the bars B being inclined toward each other from their lower to their upper ends, substantially as herein shown and described.

4. The combination, with the bars A and B, pivoted at or near their middle, of the rungs D uniting the bars A, cross-bars and braces uniting the bars B, and of the strap or rope H, substantially as herein shown and described.

ROBERT FURLONG.

Witnesses:
ROSEWILL J. BROWN,
THOMAS J. BIRCH.